US012625044B2

(12) United States Patent
Levesque et al.

(10) Patent No.: US 12,625,044 B2
(45) Date of Patent: *May 12, 2026

(54) METHODS AND APPARATUS TO PERFORM LOAD MEASUREMENTS ON FLEXIBLE SUBSTRATES

(71) Applicant: Illinois Tool Works Inc., Glenview, IL (US)

(72) Inventors: Philippe Levesque, Foxboro, MA (US); Alexander T. Carbone, Norton, MA (US); Christopher Joyce, Braintree, MA (US)

(73) Assignee: Illinois Tool Works Inc., Glenview, IL (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/427,272

(22) Filed: Jan. 30, 2024

(65) Prior Publication Data

US 2024/0248020 A1 Jul. 25, 2024

Related U.S. Application Data

(63) Continuation of application No. 16/887,960, filed on May 29, 2020, now Pat. No. 11,885,773.

(Continued)

(51) Int. Cl.
*G01N 3/20* (2006.01)
*G01N 3/06* (2006.01)

(52) U.S. Cl.
CPC .............. *G01N 3/20* (2013.01); *G01N 3/066* (2013.01); *G01N 2203/0023* (2013.01);
(Continued)

(58) Field of Classification Search
CPC .. G01N 3/20; G01N 3/066; G01N 2203/0023; G01N 2203/003;
(Continued)

(56) References Cited

U.S. PATENT DOCUMENTS

| | | | |
|---|---|---|---|
| 5,123,278 | A | 6/1992 | Mckittrick |
| 5,574,227 | A | 11/1996 | Allan |

(Continued)

FOREIGN PATENT DOCUMENTS

| | | |
|---|---|---|
| CN | 1148438 | 5/2004 |
| CN | 102713805 | 10/2012 |

(Continued)

OTHER PUBLICATIONS

Int'l Search Report and Written Opinion Appln No. PCT/US2020/035459 mailed Sep. 2, 2020.
European Examination Appln No. 20746433.0 dated Dec. 22, 2023.

*Primary Examiner* — Jonathan M Dunlap
(74) *Attorney, Agent, or Firm* — McAndrews, Held & Malloy, Ltd.

(57) ABSTRACT

An example flexible substrate testing system includes: a first substrate support structure configured to hold stationary a first portion of a flexible substrate under test; a second substrate support structure configured to hold a second portion of the flexible substrate; an actuator configured to move the second substrate support structure to fold the flexible substrate and to unfold the flexible substrate; and a load cell configured to measure a load on the flexible substrate.

20 Claims, 12 Drawing Sheets

Related U.S. Application Data

(60) Provisional application No. 62/865,634, filed on Jun. 24, 2019.

(52) U.S. Cl.
CPC .................. *G01N 2203/003* (2013.01); *G01N 2203/0282* (2013.01); *G01N 2203/04* (2013.01); *G01N 2203/0617* (2013.01)

(58) Field of Classification Search
CPC ....... G01N 2203/04; G01N 2203/0617; G01N 2203/0282
See application file for complete search history.

(56) References Cited

U.S. PATENT DOCUMENTS

| | | | | |
|---|---|---|---|---|
| 8,544,340 | B1 | 10/2013 | Ardelean | |
| 11,761,867 | B2 * | 9/2023 | Joyce | G01N 3/34 |
| | | | | 73/854 |
| 11,885,773 | B2 * | 1/2024 | Levesque | G01N 3/066 |
| 12,146,865 | B2 * | 11/2024 | Lee | G01N 3/20 |
| 2010/0116064 | A1 | 5/2010 | Wen | |
| 2013/0098145 | A1 | 4/2013 | Oh | |
| 2017/0013729 | A1 | 1/2017 | Rothkopf | |
| 2019/0154555 | A1 | 5/2019 | Han | |
| 2019/0391058 | A1 | 12/2019 | Lee | |
| 2020/0400541 | A1 | 12/2020 | Levesque | |
| 2021/0018412 | A1 | 1/2021 | Levesque | |
| 2021/0341367 | A1 | 11/2021 | Joyce | |

FOREIGN PATENT DOCUMENTS

| | | |
|---|---|---|
| CN | 104076828 | 10/2014 |
| CN | 104464529 | 3/2015 |
| CN | 107644589 | 1/2018 |
| JP | H11233398 | 8/1999 |
| JP | 2019039743 | 3/2019 |
| KR | 101489667 | 2/2015 |
| KR | 101843874 | 3/2018 |
| WO | 2018128265 | 7/2018 |

* cited by examiner

100

202

206
Random Access Memory
Instructions
204

210
Mass Storage Device

212

208
Read Only Memory
Instructions
204

214
Network Interface

218
Network

203
Processor
Instructions
204

224
Display Device

222
Machine Readable Medium

216
I/O Interface

220
I/O Device(s)

201

Control Processor
238

250
252
Control Panel
Input Device(s)

236
Material Fixturing
Grips 248

Actuator 246

Frame 228

Load Cell 230

Displacement Transducer 232

METHODS AND APPARATUS TO PERFORM LOAD MEASUREMENTS ON FLEXIBLE SUBSTRATES

RELATED APPLICATIONS

The present application claims the benefit of U.S. Provisional Patent Application Ser. No. 62/865,634, filed Jun. 24, 2019, entitled "METHODS AND APPARATUS TO PERFORM LOAD MEASUREMENTS ON FLEXIBLE SUBSTRATES." The entirety of U.S. Provisional Patent Application Ser. No. 62/865,634 is expressly incorporated herein by reference.

BACKGROUND

This disclosure relates generally to materials testing, and more particularly, to methods and apparatus to perform load measurements on flexible substrates.

Reliability testing for an assembly, or moving components of an assembly, may involve repetitively performing intended and/or unintended movements of the components to verify that the components and/or assembly reliably operates for a defined minimum number of cycles of the movements. For example, reliability testing of a flexible substrate may involve repeatedly flexing the substrate in one or more ways, while testing for continued operation of the device and/or monitoring various modes of failure.

SUMMARY

Methods and apparatus to perform load measurements on flexible substrates are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1A:
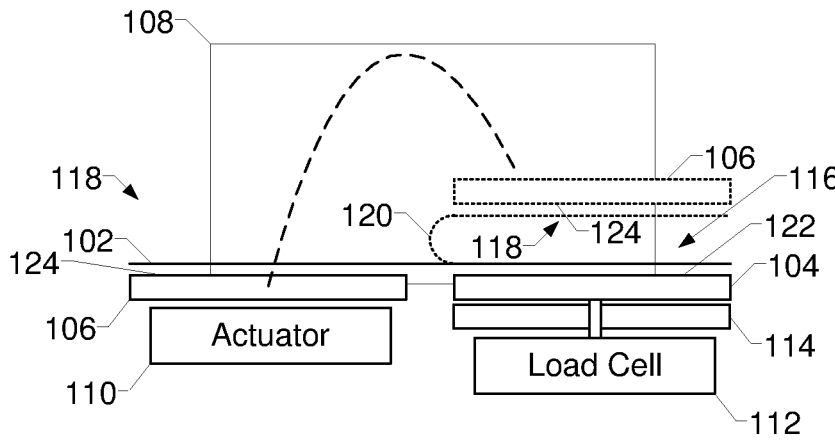
FIG. 1A is a block diagram of an example flexible substrate test system to perform mechanical property testing on a flexible substrate, in accordance with aspects of this disclosure.

Conventional flexible substrate testing systems do not measure loads or stresses on the flexible substrates during folding or unfolding. Instead, conventional flexible substrate testing systems may involve testing such as defect analysis and other static testing and analysis.

Disclosed example flexible substrate testing systems and methods provide stress testing for flexible substrates, including measurement of dynamic and/or static loads on the flexible substrate during deformation such as folding and/or unfolding. Some disclosed example systems and methods reduce or minimize additional stress induced on the flexible substrate by the flexible substrate testing system itself. For example, some disclosed flexible substrate testing systems include fixturing that provides repetitive folding and unfolding of a flexible substrate, such as a flexible display screen. Disclosed examples configure the fixturing, such as guiding of the moving parts, such that the fixturing does not create additional compression or tension on the flexible substrate as the ends of the substrate are folded together or unfolded.

Disclosed example flexible substrate testing systems include: a first substrate support structure configured to hold stationary a first portion of a flexible substrate under test; a second substrate support structure configured to hold a second portion of the flexible substrate; an actuator configured to move the second substrate support structure to fold the flexible substrate and to unfold the flexible substrate; and a load cell configured to measure a load on the flexible substrate.

Some example flexible substrate testing systems further include a first guide configured to guide a motion of the second substrate support structure to fold the flexible substrate and to unfold the flexible substrate. In some example flexible substrate testing systems, the first guide is configured to guide the motion of the second substrate support structure in accordance with a first predetermined bend radius of the flexible substrate. In some example flexible substrate testing systems, the first guide is interchangeable with a second guide configured to guide the motion of the second substrate support structure in accordance with a second predetermined bend radius of the flexible substrate.

In some example flexible substrate testing systems, the first guide includes a first guide plate having a groove configured to guide a cam follower attached to the second substrate support structure. In some example flexible substrate testing systems, the first guide plate includes an actuator groove configured to guide an actuator pin coupled to the second substrate support structure and positioned within the actuator groove, and the actuator is configured to move the second substrate support structure by moving the actuator pin.

In some example flexible substrate testing systems, the first guide is configured to guide the motion of the second substrate support structure without incurring additional stress on the flexible substrate due to the motion or weight of the second substrate support structure. Some example flexible substrate testing systems further include a second guide coupled to the second substrate support structure and on an opposite side of the second substrate support structure from the first guide, in which the second guide plate is configured to guide the motion of the second substrate support structure to fold the flexible substrate and to unfold the flexible substrate.

Some example flexible substrate testing systems include a load limiter configured to limit displacement of the first substrate support structure toward the load cell. Some example flexible substrate testing systems include control circuitry configured to determine the load on the flexible substrate based on load information from the load cell. In some example flexible substrate testing systems, the control circuitry is configured to determine the load on the flexible substrate based on a dynamic load measured by the load cell during the folding or unfolding of the flexible substrate. In some example flexible substrate testing systems, the control circuitry is configured to determine the load on the flexible substrate based on a static load measured by the load cell at a completion of the folding or unfolding of the flexible substrate.

Some example flexible substrate testing systems include control circuitry configured to control the actuator to move the second substrate support structure in a first direction to fold the flexible substrate or in a second direction to unfold the flexible substrate. Some example flexible substrate testing systems include a translation linkage configured to hold the first substrate support structure and to limit motion of the first substrate support structure to a direction in which the load cell is configured to measure the load.

In some example flexible substrate testing systems, the load cell is configured to measure the load on the first portion of the flexible substrate. In some example flexible substrate testing systems, the load cell is configured to measure at least a portion of the load on the second portion of the flexible substrate. Some example flexible substrate testing systems include control circuitry configured to compensate a load measurement from the load cell for a weight of the second substrate support structure and a momentum of the substrate support structure during folding or unfolding, and to determine at least a portion of the load on the flexible substrate based on load information from the load cell and the compensation. Some example flexible substrate testing systems include a second load cell configured to measure a portion of the load on the first portion of the flexible substrate.

Disclosed example methods to measure loads on a flexible substrate involve: holding stationary, via a substrate support structure, a first portion of a flexible substrate under test; moving, via an actuator, a second portion of the flexible substrate to fold the flexible substrate or to unfold the flexible substrate; and measuring a load on the flexible substrate resulting from the moving.

Some other example flexible substrate testing systems include: a first plate comprising a first surface configured to hold stationary a first side of a flexible substrate under test; a translation linkage configured to hold the first plate and to limit motion of the plate in directions parallel to the first surface of the plate; a second plate comprising a second surface configured to hold a second side of the flexible substrate; a first guide plate configured to guide a motion of the second surface to fold the flexible substrate and to unfold the flexible substrate; an actuator configured to move the second plate in accordance with the first guide plate to fold the flexible substrate and to unfold the flexible substrate; and a load cell configured to measure loads on the first plate while the actuator moves the second plate.

FIG. 1A is a block diagram of an example flexible substrate test system 100 to perform mechanical property testing on a flexible substrate 102. The example flexible substrate 102 may be a flexible display screen or other device, fabric, material, and/or any other substrate. The system 100 of FIG. 1A is configured to repeatedly fold and unfold the flexible substrate 102 to measure stress on the substrate 102

The example system 100 includes a first plate 104, a second plate 106, a guide plate 108, an actuator 110, a load cell 112, and a translation linkage 114. The system 100 may include additional features, such as structural support or framing, processing circuitry, communications and/or input/output (I/O) circuitry, and/or any other components.

When folded, the flexible substrate 102 is considered to have a first side 116 and a second side 118 on opposing ends of the bend 120 or fold in the substrate 102. The first side 116 and the second side 118. FIG. 1A illustrates the substrate in an unfolded or flat position (solid line) and folded position (dotted line).

The first plate 104 is a first substrate support structure, and has a first surface 122 to which the first side 116 of the substrate 102 is attached or affixed. The first side 116 of the substrate 102 is held stationary with respect to the first surface 122. The second plate 106 is a second substrate support structure, and has a second surface 124 to which the second side 118 of the substrate 102 is attached or affixed. The second side of the substrate 102 is held stationary with respect to the second surface 124. The plates 104, 106 are separated by a gap, which is bridged by a portion of the substrate 102 that forms the curve 120 when the substrate 102 is folded.

While the first and second substrate support structures in FIG. 1A are first and second plates, in other examples the first and second substrate support structures may be different. For example, other first and second substrate support structures may include clips or clamps to hold portions of the substrate 102 to enable folding without attachment of the substrate 102 to the plate.

The guide plate 108 guides a motion of the second plate 106 and, thus, the second surface 124, to fold and unfold the flexible substrate 102. As described in more detail below, the guide plate 108 may include multiple grooves, which are engaged by corresponding cam followers attached to the second plate 106 to guide translation and rotation of the second plate 106. By including multiple grooves and cam followers instead of a single groove and cam follower, the example system 100 may avoid creating additional stress on the substrate 102. For example, multiple grooves that have a consistent spacing prevent introduction of a moment due to the weight of the second plate 106, which may cause additional stress on the substrate 102 and influence the test results.

While the example of FIG. 1A includes a guide plate 108 as a guide to define the folding path, in other examples the guide may be different and/or may be omitted to enable the flexible substrate to define the folding and/or unfolding path(s). For example, other guides may include having multiple gears, in which a first gear is free to spin and is aligned with the edge of the first side of the substrate 102, and a second gear is meshed with the first gear and fixed with respect to the second half of the substrate 102. Other example guides may include combination of two linear actuators arranged perpendicular to each other, with one mounted to the other, in which the second plate 106 is attached to the actuators, and could move freely in an x-y plane and trace out the folding path. Multiple linear actuators may enable the guide to implement different types of paths, including folds of different radii and/or non-circular folds. Some other example guides may include a series of linkages defining the folding path.

The actuator 110 is coupled to the second plate 106 to move the second plate 106. As illustrated in FIG. 1A, the actuator 110 moves the second plate 106 between a first position in which the substrate 102 is unfolded (e.g., shown in solid lines) and a second position in which the substrate 102 is folded (e.g., in broken lines). In some examples, the actuator 110 may be a motor attached to the second plate 106 via linkage and an actuator pin coupled to the second plate 106. The actuator pin may also be guided via the guide plate 108 to control the direction in which the actuator 110 exerts force on the second plate 106.

The load cell 112 measures loads on the first plate 104 while the actuator 110 moves the second plate 106. In particular, the load cell 112 measures stress (e.g., folding force) on the substrate 102 as the substrate 102 is folded by measuring load exerted by the first side 116 of the substrate 102 onto the first plate 104. The load cell 112 may output load measurements during folding and/or unfolding (e.g., measurements of dynamic load) and/or at the conclusion of a folding and/or unfolding process (e.g., measurements of static load).

The translation linkage 114 limits movement of the first plate 104 in directions other than the direction in which the load cell 112 is loaded by the first plate 104. For example, if the load cell 112 is configured to measure loads in a direction perpendicular to the plane of the first surface 122, the translation linkage 114 limits movement of the first plate 104 in directions parallel to the plane of the first surface 122 while permitting load to be transferred from the first plate 104 to the load cell 112. An example translation linkage 114 may include one or more four-bar linkages coupled to a frame that is fixed with respect to the load cell 112. In some examples, the translation linkage 114 is further limited in a direction toward the load cell 112 to prevent overloading of the load cell 112. For example, a stopping point may be attached to the frame to prevent movement of the four-bar linkage(s) and the plate 104 toward the load cell 112 beyond the stopping point.

In operation, the example load cell 112 may be biased or offset after securing the substrate 102 to the first plate 104 and the second plate 106 to subtract a preload from the test measurements. For example, the preload on the load cell 112 may occur due to the weight of the plate 104, the weight of translation linkage 114, and the weight of the first side 116 of the substrate 102 on the first plate 104. By determining the preload on the load cell 112, the load cell 112 can be calibrated or offset to measure the stress on the substrate 102 during folding and unfolding.

Figure 1B:
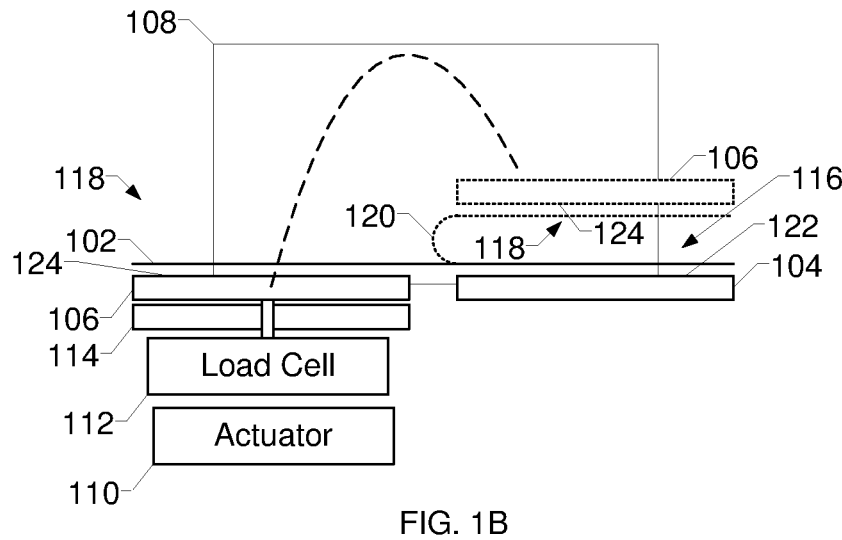
FIG. 1B is a block diagram of another example flexible substrate test system to perform mechanical property testing on the flexible substrate.

FIG. 1B is a block diagram of another example flexible substrate test system 150 to perform mechanical property testing on the flexible substrate 102. The flexible substrate test system 150 of FIG. 1B is similar to the flexible substrate test system 100 of FIG. 1A, but the load cell 112 is coupled to the second plate 106 (e.g., the moving plate) instead of the first plate 104 (e.g., the stationary plate), and measures loads on the portion of the flexible substrate 102 coupled to the second plate 106. In still other examples, load cell(s) may be coupled to both plates 104, 106 to measure forces on both portions of the flexible substrate 102.

In the example of FIG. 1B, the measurements output by the load cell 112 are compensated for the weight of the second plate 106 and the inertial load of the second plate 106, to provide a measurement of the force on the flexible substrate 102. For example, the portion of the weight of the second plate 106 and the portion of the inertial load of the second plate 106 that results in a measurable force by the load cell 112 may continuously change during the folding motion. A processing system (e.g., the processor 203 disclosed below) may be configured to compensate measurements received from the load cell 112 based on the characteristics, the folding direction, the folding speed, and/or the folding path of the second plate 106 and/or of the actuator 110, and/or any other dynamic forces occurring during the folding and/or unfolding processes.

Figure 2:
FIG. 2 is a block diagram of an example implementation of the flexible substrate test system of FIG. 1A.

FIG. 2 is a block diagram of an example implementation of the flexible substrate test system 100 of FIG. 1A. As illustrated in FIG. 2, the flexible substrate test system 100 includes a test fixture 201 and a computing device 202.

The example computing device 202 may be a general-purpose computer, a laptop computer, a tablet computer, a mobile device, a server, an all-in-one computer, and/or any other type of computing device. The computing device 202 of FIG. 2 includes a processor 203, which may be a general-purpose central processing unit (CPU). In some examples, the processor 203 may include one or more specialized processing units, such as FPGA, RISC processors with an ARM core, graphic processing units, digital signal processors, and/or system-on-chips (SoC). The processor 203 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 203, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 2 includes hardware, firmware, and/or software to connect one or more input/output devices 220 to the processor 203 for providing input to the processor 203 and/or providing output from the processor 203. For example, the I/O interface 216 may include a graphics-processing unit for interfacing with a display device, a universal serial bus port for interfacing with one or more USB-compliant devices, a Fire Wire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 202 may access a non-transitory machine-readable medium 222 via the I/O interface 216 and/or the I/O device(s) 220. Examples of the machine-readable medium 222 of FIG. 8 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The test fixture 201 is coupled to the computing device 202. In the example of FIG. 2, the test fixture 201 is coupled to the computing device via the I/O interface 216, such as via a USB port, a Thunderbolt port, a FireWire (IEEE 1394) port, and/or any other type serial or parallel data port. In some examples, the test fixture 201 is coupled to the network interface 214 and/or to the I/O interface 216 via a wired or wireless connection (e.g., Ethernet, Wi-Fi, etc.), either directly or via the network 218.

The test fixture 201 includes a frame 228, a load cell 230, material fixtures 236, and a control processor 238. The frame 228 provides rigid structural support for the other components of the test fixture 201 that perform the test. The load cell 230 may implement the load cell 112 of FIG. 1A, and measures force applied to a material under test (e.g., the substrate 102) by an actuator 246 via grips 248 (e.g., the plates 104, 106).

The actuator 246 applies force to the material under test and/or forces displacement of the material under test, while the grips 246 grasp or otherwise couple the material under test to the actuator 234.

Example actuators that may be used to provide force and/or motion of a component of the test fixture 201 include electric motors, pneumatic actuators, hydraulic actuators, piezoelectric actuators, relays, and/or switches. While the example test fixture 201 uses a motor, such as a servo or direct-drive linear motor, other systems may use different types of actuators. For example, hydraulic actuators, pneumatic actuators, and/or any other type of actuator may be used based on the requirements of the system.

The example grips 236 include platens, clamps, and/or other types of fixtures, depending on the mechanical property being tested and/or the material under test. The grips 236 may be manually configured, controlled via manual input, and/or automatically controlled by the control processor 238.

The test system 100 may further include one or more control panels 250, including one or more input devices 252. The input devices 252 may include buttons, switches, and/or other input devices located on an operator control panel. For example, the input devices 252 may include buttons that control the actuator 242 to jog (e.g., position) the grips 248 to a desired position, switches (e.g., foot switches) that control the grips 248 to close or open (e.g., via another actuator), and/or any other input devices to control operation of the testing test fixture 201.

The example control processor 238 communicates with the computing device 202 to, for example, receive test parameters from the computing device 202 and/or report measurements and/or other results to the computing device 202. For example, the control processor 238 may include one or more communication or I/O interfaces to enable communication with the computing device 202. The control processor 238 may control the actuator 246 to move in a given direction and/or to control the speed of the actuator 246, control the fixture(s) 236 to grasp or release a material under test, and/or receive measurements from the displacement transducer 232, the load cell 230 and/or other transducers.

The example control processor 238 is configured to implement a repetitive motion testing process in which a test specimen (e.g., the substrate 102) is subjected to testing in the test fixture 201. For example, to measure stress on the substrate 102 during or after a series of folding and unfolding motions, the control processor 238 controls the actuator 246 to move the grips 248 (e.g., the first and second plates 104, 106) while monitoring the load cell 230 to measure stress on the substrate 102. In some examples, the control processor 238 monitors a motor encoder of the actuator 246 to determine a folding angle and/or establish a folding degree-per-pulse ratio.

The example processor 203 may determine a static load on the flexible substrate 102 based on a load measured by the load cell 230 at a completion of the folding or unfolding of the flexible substrate 102. The static load measurement may occur after a relaxation time has been permitted to expire to enable the substrate 102 to relax following a folding or unfolding process. Additionally or alternatively, the example processor 203 may determine a dynamic load on the flexible substrate 102 based on loads measured by the load cell 230 during the folding or unfolding of the flexible substrate 102. The example processor 203 may perform compensation of measurements from the load cell(s) 230, such as removing the effects of weight of the first plate 104, and/or weight and inertial load of the second plate 106, from the load measurements.

Figure 3:
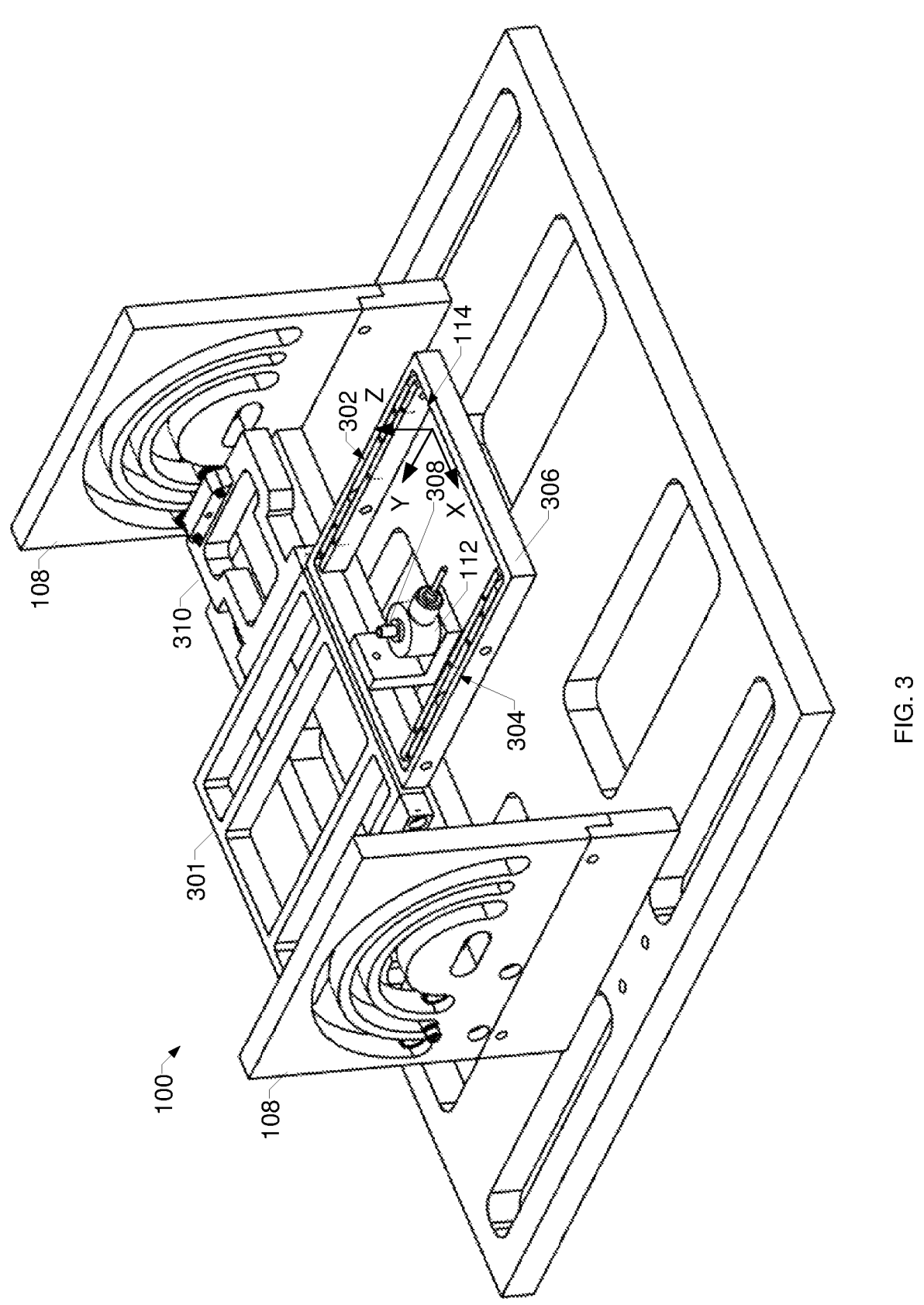
FIG. 3 is a perspective view of an example implementation of the flexible substrate test system of FIG. 1A.

FIG. 3 is a perspective view of an example implementation of the flexible substrate test system 100 of FIG. 1A. The example view of FIG. 3 illustrates a rotational arm 301 configured to move the second plate 106, the load cell 112, and an example implementation of the translation linkage 114. The first plate 104 is not shown in FIG. 3. The second plate 106 may be attached to the rotational arm 301.

The example translation linkage 114 includes a first four-bar linkage 302, a second four-bar linkage 304, and a frame 306. The frame 306 and the load cell 112 are stationary with respect to each other by attachment to a fixture frame (e.g., the frame 228 of FIG. 2). The first and second four-bar linkages 302, 304 are each configured to attach the first plate 104 via the innermost links. The first and second four-bar linkages 302, 304 limit movement of the first plate 104 in directions parallel to the surface of the first plate 104 on which the substrate 102 is mounted (illustrated as directions X and Y in FIG. 3), while permitting loads from the first plate 104 to be transferred to the load cell 112 (e.g., via an extension post 308 coupled to the load cell 112) in a direction perpendicular to the surface of the first plate 104 (illustrated as direction Z in FIG. 3).

To avoid overloading of the load cell 112, the frame 306 includes a stopping point configured to prevent the first and second four-bar linkages 302, 304 and/or the first plate 104 from traveling toward the load cell 112 beyond the stopping point. The stopping point may be implemented using, for example, a pin or other rigid fastener configured to contact an underside of the first and/or second four-bar linkages 302, 304, a top surface of the frame 306, a bumper or rigid offset coupled to a top surface of the frame 306 to provide the stopping point via contact with first plate 104, and/or any other technique.

The rotational arm 301 is configured to rotate and translate the second plate 106 with respect to the first plate 104 to fold and unfold the substrate 102. The rotational arm 301 is coupled to the guide plates 108 via rotational assemblies 310, which include cam followers configured to travel through cam grooves in the guide plates 108 as discussed below with reference to FIG. 4.

Figure 4:
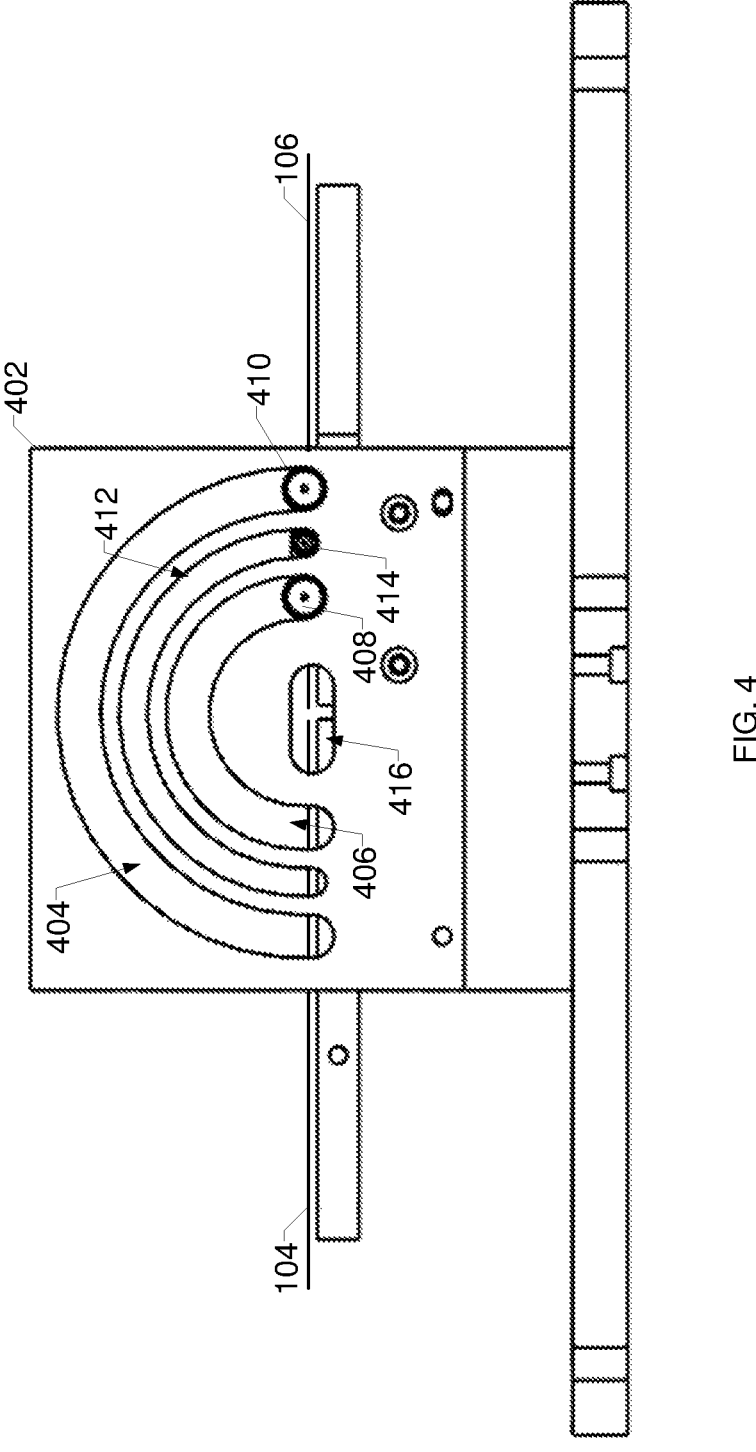
FIG. 4 is an elevation view of the example substrate test system of FIG. 1A, including a guide plate.

FIG. 4 is an elevation view of the example flexible substrate test system 100 of FIG. 1A, including a guide plate 402 (e.g., the guide plate 108 of FIG. 1A). The example guide plate 402 includes two cam grooves 404, 406, within which two cam followers 408, 410 are moved to rotate and move the second plate 106. The grooves 404, 406 are separated by the same distance over the arc lengths of the grooves 404, 406, such that the cam followers 408, 410 support the weight of the second plate 106 via the rotational arm 301 and the rotational assemblies 310, and substantially no stress is induced on the substrate 102 due to the weight of the second plate 106.

The guide plate 402 includes an actuator groove 412 configured to receive an actuation pin 414 coupled to the second plate 106. The actuator groove 412 is separated by the same distance from the cam groove 404 over the arc lengths of the grooves 404, 412 and is separated by the same distance from the cam groove 406 over the arc lengths of the grooves 406, 412.

The example grooves 404, 406, 412 may be configured to cause a specified bend radius in the substrate 102 when the second plate 106 is rotated toward the first plate 104. To this end, the guide plate 402 may be interchangeable with other guide plates that cause different bend radii in the substrate 102. The arrangements and geometries of the grooves 404, 406, 412 may be determined by calculating a set of angles and positions at which the cam followers 408, 410 and the actuation pin 414 are located with reference to an effective bend axis of the substrate 102, over the course of travel of the substrate 102, such that the length of the substrate 102 does not change and, therefore, compression and tension forces are not introduced to the substrate 102.

In the example of FIG. 4, the guide plate 402 includes a bend viewing window 416, through which a camera or other monitoring device may observe the bend radius of the substrate 102.

Figure 5:
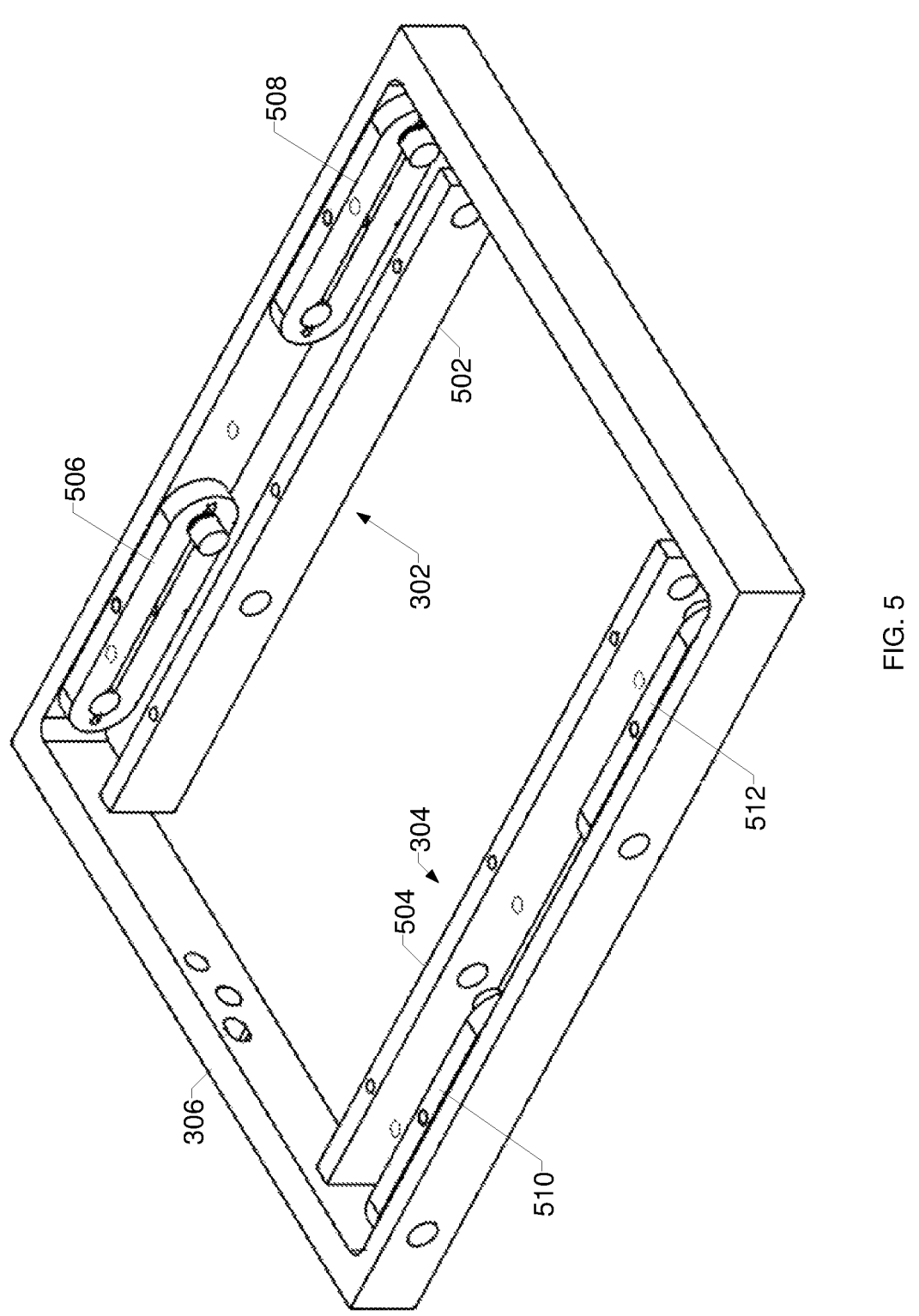
FIG. 5 is a partially exploded view of the translation linkage of FIG. 3.

FIG. 5 is a partially exploded view of the translation linkage 114 of FIG. 3. In particular, the example translation linkage 114 is shown with inner linkages 502, 504 of the four-bar linkages 302, 304 separated from intermediate linkages 506, 508, 510, 512, respectively. The intermediate linkages 506-512 couple the inner linkages 502, 504 to the frame 306, which serves as a portion of the four-bar linkages 302, 304.

Figure 6:
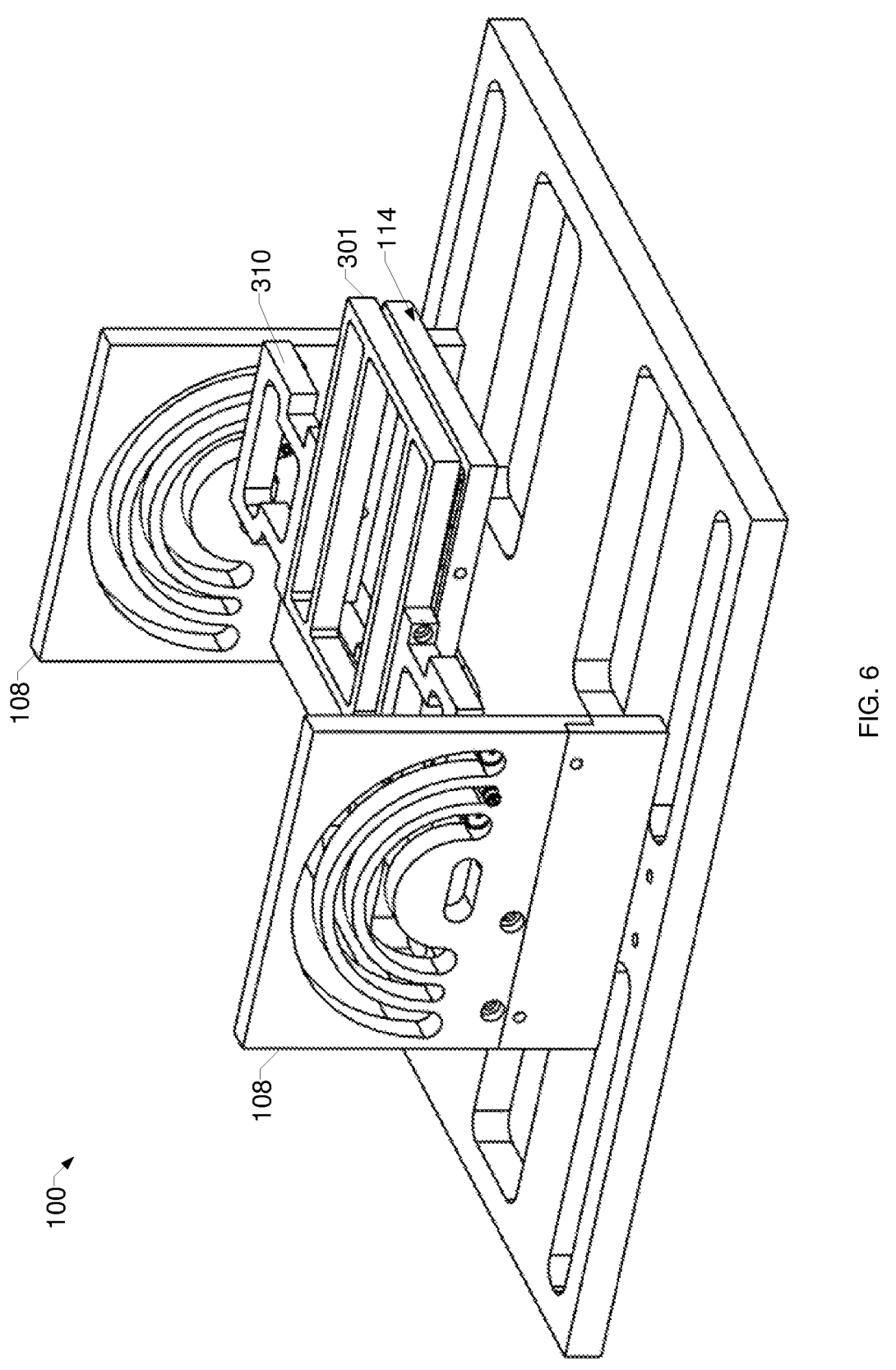
FIG. 6 is a perspective view of the example flexible substrate test system of FIG. 3 in which the second plate has been moved to position to fold the substrate under test.

FIG. 6 is a perspective view of the example flexible substrate test system 100 of FIG. 3 in which the second plate 104 has been moved to position to fold the substrate under test 102.

Figure 7:
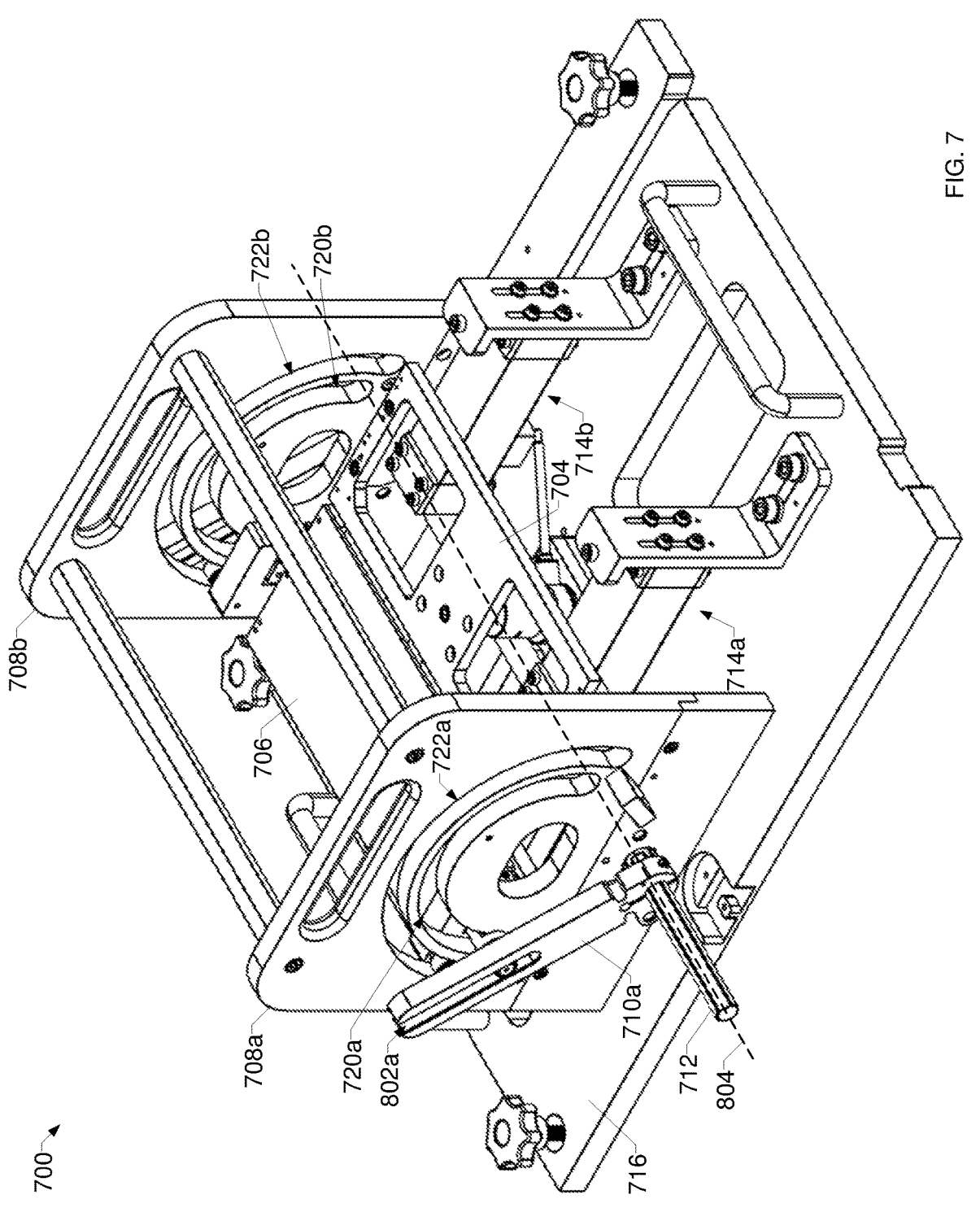
FIG. 7 is a perspective view of another example implementation of the flexible substrate test system of FIG. 1A.
Figure 8:
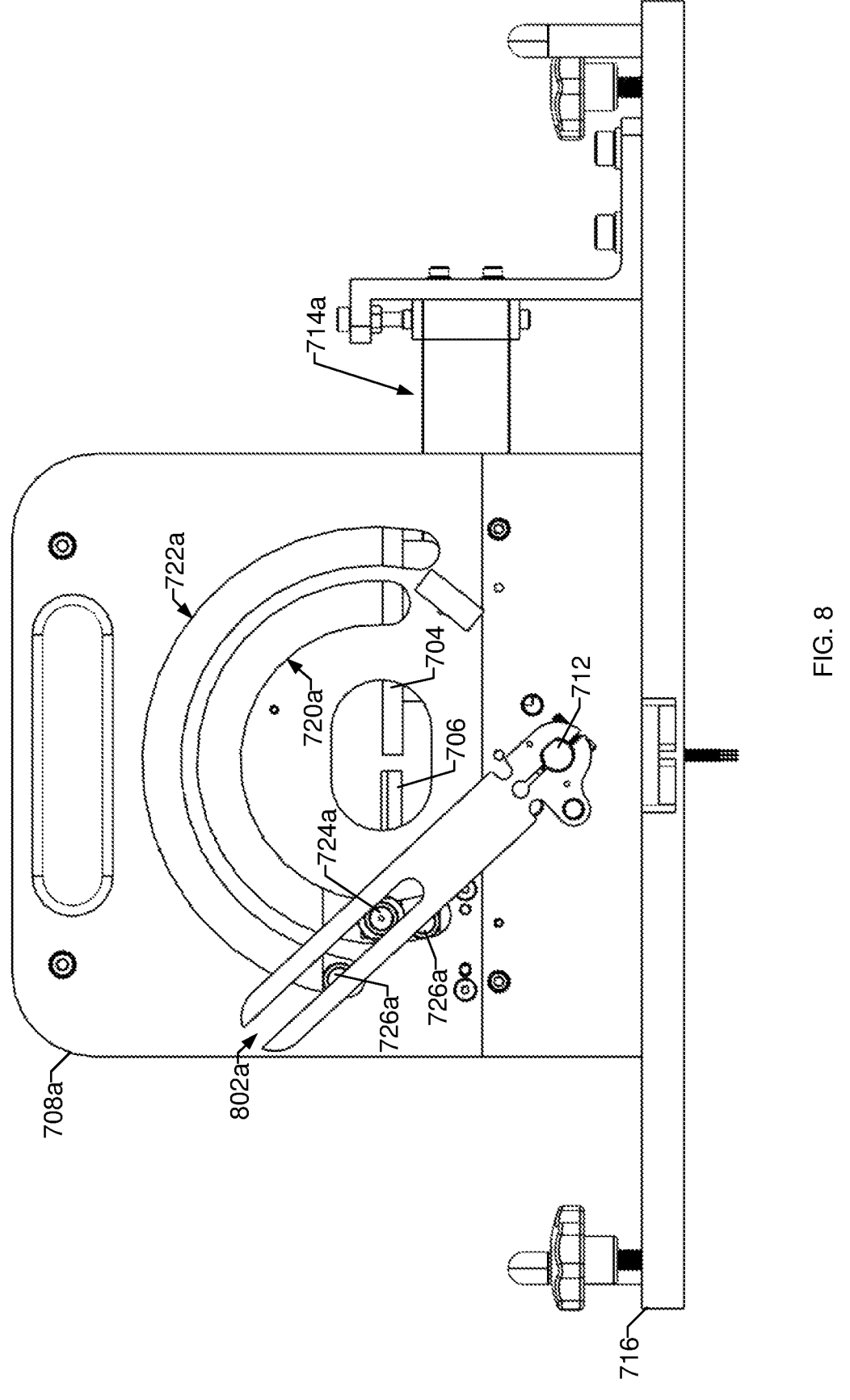
FIG. 8 is an elevation view of the example flexible substrate test system of FIG. 7.
Figure 9:
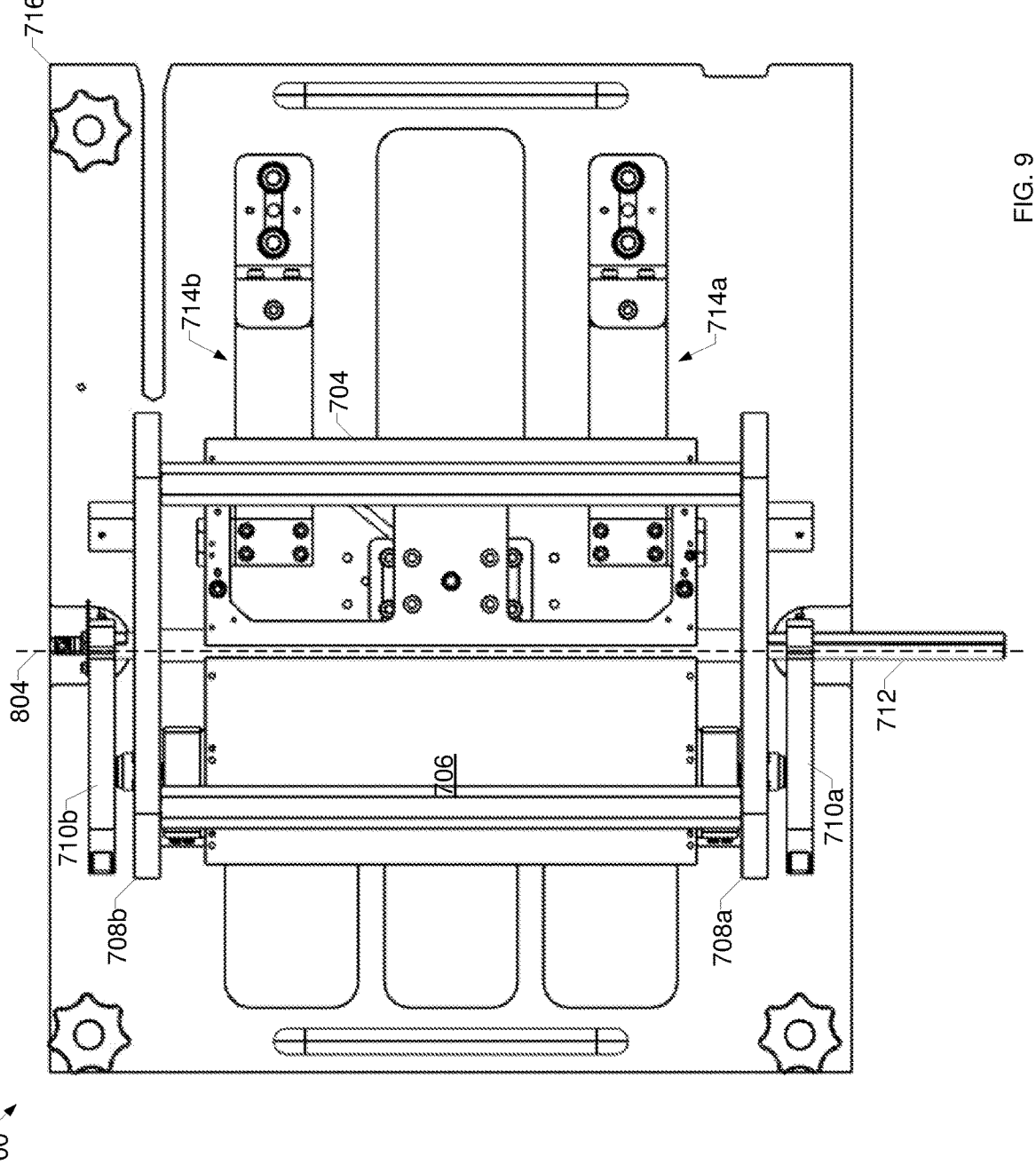
FIG. 9 is a plan view of the example flexible substrate test system of FIG. 7.
Figure 10:
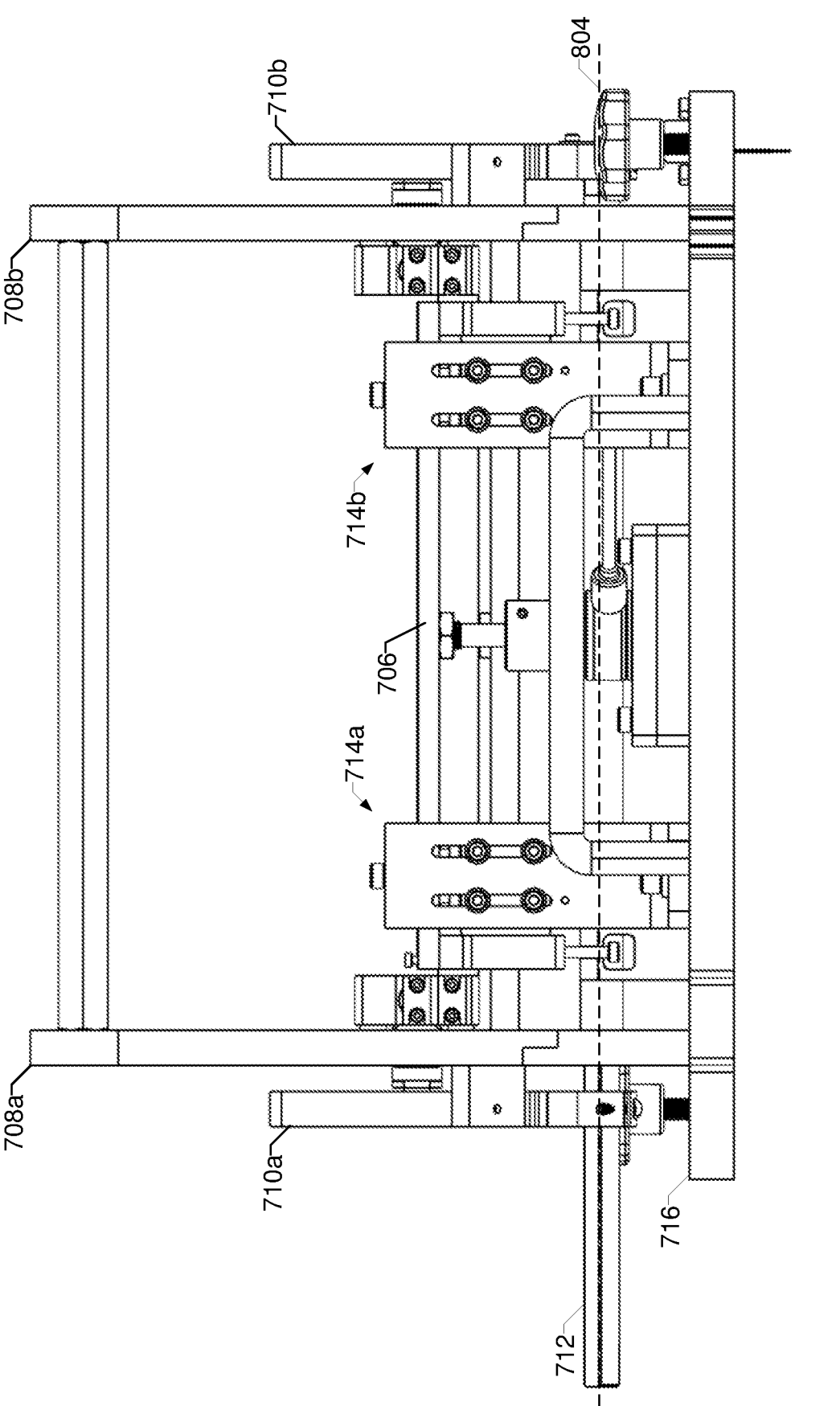
FIG. 10 is an elevation view of the example flexible substrate test system of FIG. 7.

FIG. 7 is a perspective view of another example flexible substrate test system 700 that may be used to implement the flexible substrate test system 100 of FIG. 1A. FIG. 8 is an elevation view of the example flexible substrate test system 700 of FIG. 7. FIG. 9 is a plan view of the example flexible substrate test system of FIG. 7. FIG. 10 is an elevation view of the example flexible substrate test system of FIG. 7.

The example flexible substrate test system 700 includes a first plate 704, a second plate 706, guide plates 708a, 708b, and drive arms 710a, 710b that are driven via a drive shaft 712. The first plate 704 remains stationary while the drive arms 710a, 710b moves the second plate 706 according to a path defined by the guide plates 708a, 708b to fold a substrate attached to the first and second plates 704, 706.

In the example of FIGS. 7-9, the example translation linkage 114 includes flexures 714a, 714b, which are coupled to a same base plate 716 as the guide plates 708a, 708b. The flexures 714a, 714b support the first plate 704 and permit transfer of load from the flexible substrate to a load cell 718.

The flexures 714a, 714b limit movement of the first plate 704 in directions other than the direction in which the load cell 718 measures force.

The example guide plates 708a, 708b are similar to the guide plates 108 illustrated in FIG. 3. In the example of FIGS. 7-9, the guide plates 708a, 708b each include an actuator groove 720a, 720b and one cam groove 722a, 722b. The drive arms 710a, 710b are coupled to the respective actuator grooves 720a, 720b (e.g., via preloaded actuation pins 724a, 724b) to move (e.g., fold, unfold) the second plate 706.

Both the actuator grooves 720a, 720b (e.g., via the preloaded cam followers 724a, 724b) and the cam grooves 722a, 722b (e.g., via cam followers or bearings 726a, 726b) are coupled to the second plate 706 to control a path of movement and folding of the second plate 708 and, as a result, the path of folding of the substrate. The example guide plates 708a, 708b may include more actuator grooves 720a, 720b and/or cam grooves 722a, 722b.

As illustrated in FIG. 8, the drive arms 710a, 710b includes respective slots 802a, 802b extending radially from a pivot axis 804 of the drive arms 710a, 710b. In the example of FIG. 8, the actuator 110 actuates (e.g., rotates) the drive arms 710a, 710b via the drive shaft 712 defining the pivot axis 804. The slots 802a, 802b guide the respective bearings 726a, 726b as the drive arms 710a, 710b are rotated, while permitting the bearings 726a, 726b to move freely along the lengths of the slots 802a, 802b as the drive arms 710a, 710b are rotated.

Figure 11:
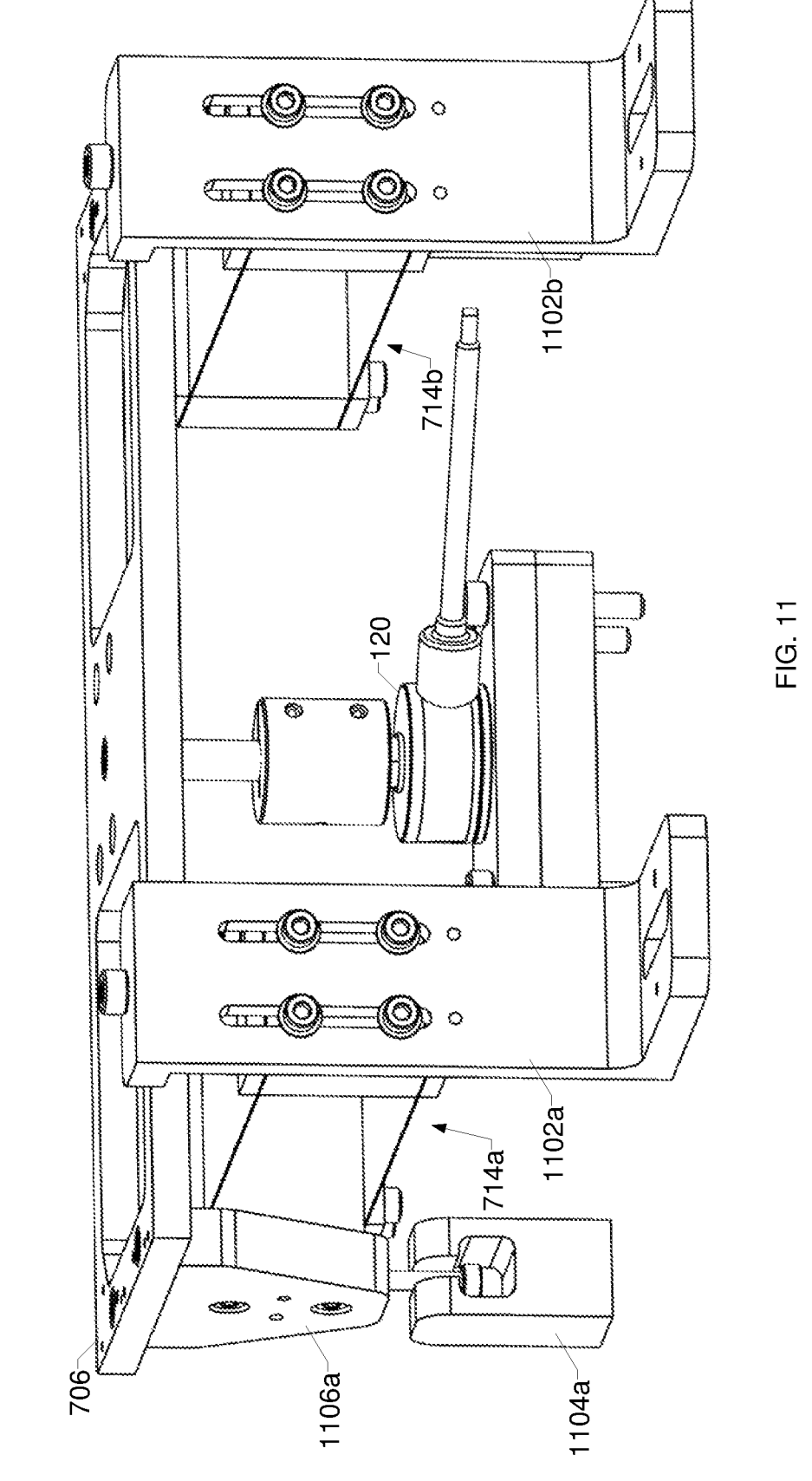
FIG. 11 is a more detailed view of the example first plate, the flexures, and the load cell of FIG. 7.

FIG. 11 is a more detailed view of the example first plate 704, the flexures 714a, 714b, and the load cell 120 of FIG. 7. The example flexures 714a, 714b are supported by brackets 1102a, 1102b, which are coupled to the base plate 310.

The flexures 714a, 714b include strips of metal attached to the brackets 1102a, 1102b and the first plate 110 to support the weight of the first plate 110. The first plate 110 is also coupled to the load cell 120 to transfer loads to the load cell 120 for measurement.

To avoid overloading of the load cell 120, the first plate 110 includes a stopping point configured to prevent the first plate 110 from traveling toward the load cell 120 beyond the stopping point. In the illustrated example, the stopping point is implemented using stopping blocks 1104a, 1104b. Support brackets 1106a, 1106b couple the flexures 714a, 714b to the first plate 110. The blocks 1104a, 1104b are configured to stop support brackets 1106a, 1106b that couple the flexures 714a, 714b to the first plate 110 after a predetermined amount of travel of the support brackets 1106a, 1106b (e.g., a predetermined amount of load on the first plate 110).

Figure 12:
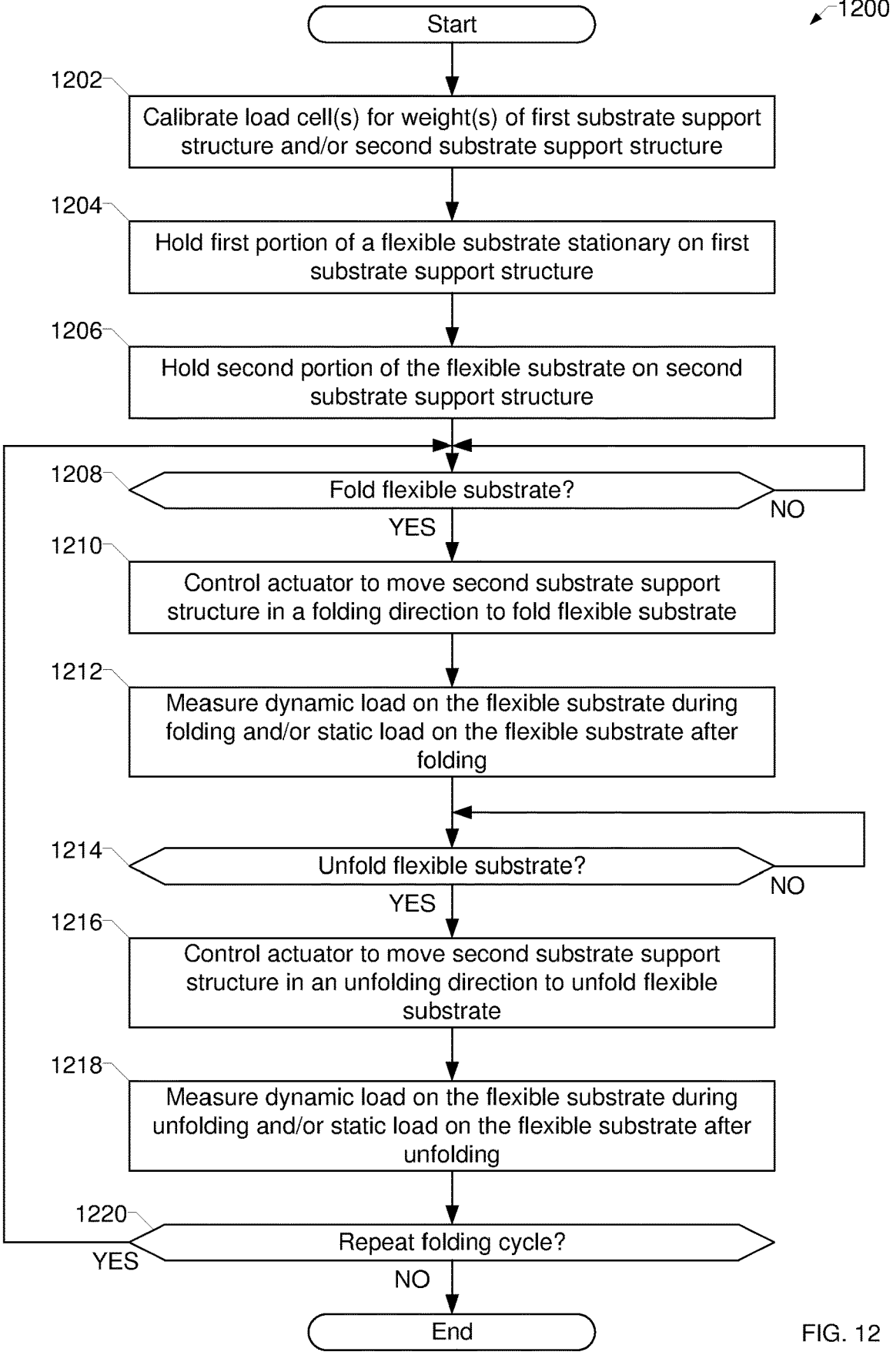
FIG. 12 is a flowchart representative of an example method to measure loads on a flexible substrate, which may be performed by the example flexible substrate test systems of FIGS. 1A-11.

FIG. 12 is a flowchart representative of an example method 1200 to measure loads on a flexible substrate, which may be performed by the example flexible substrate test systems of FIGS. 1A-11. The example method 1200 is disclosed below with reference to FIGS. 1A and 2.

At block 1202, the processor 203 and/or the control processor 238 calibrate the load cell(s) 112, 230 to compensate for the weight(s) of the first and/or second substrate support structure(s) (e.g., the first plate 104, the second plate 106), the translation linkage 114, and/or any other forces that affect the measurement by the load cell(s) 112, 230.

At block 1204, the first substrate support structure (e.g., the first plate 104) holds a first portion of the flexible substrate 102 stationary. At block 1206, the second substrate support structure (e.g., the second plate 106) holds a second portion of the flexible substrate 102.

At block 1208, the processor 203 and/or the control processor 238 determine whether to fold the flexible substrate 102. For example, the processor 203 may determine whether a folding cycle (e.g., folding and unfolding) is to be performed. If the folding is not to be performed (block 1208), control iterates to block 1208 to await folding.

When folding is to be performed (block 1208), at block 1210 the processor 203 and/or the control processor 238 control the actuator 110 to move the second substrate support structure in a folding direction to fold the flexible substrate 102. In some examples, one or more guides, such as the guide plates 108, may be used to control the bend radius and/or folding path of the flexible substrate 102 during the folding. At block 1212, the load cell(s) 112, 230 measure a dynamic load on the flexible substrate 102 during the folding and/or measure a static load on the flexible substrate 102 after folding.

At block 1214, the processor 203 and/or the control processor 238 determine whether to unfold the flexible substrate 102. If the unfolding is not to be performed (block 1214), control iterates to block 1214 to await unfolding.

When unfolding is to be performed (block 1214), at block 1216 the processor 203 and/or the control processor 238 control the actuator 110 to move the second substrate support structure in an unfolding direction to unfold the flexible substrate 102. In some examples, one or more guides, such as the guide plates 108, may be used to control the bend radius and/or folding path of the flexible substrate 102 during the unfolding. At block 1218, the load cell(s) 112, 230 measure a dynamic load on the flexible substrate 102 during the unfolding and/or measure a static load on the flexible substrate 102 after unfolding.

At block 1220, the processor 203 and/or the control processor 238 determine whether to repeat the folding cycle. For example, the flexible substrate 102 may be subject to a testing process involving multiple folding cycles. If the folding cycle is to be repeated (block 1220), control returns to block 1208. If the folding cycle is not to be repeated (block 1220), the example method 1200 ends.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A flexible substrate testing system, comprising:
   a first substrate support structure configured to hold stationary a first portion of a flexible substrate under test;
   a second substrate support structure configured to hold a second portion of the flexible substrate;
   an actuator configured to move the second substrate support structure to fold the flexible substrate and to unfold the flexible substrate;
   a load cell configured to measure a load on the flexible substrate; and
   a flexure configured to hold the first substrate support structure and to limit motion for the first substrate support structure to a direction in which the load cell is configured to measure the load.

2. The flexible substrate testing system as defined in claim 1, further comprising a first guide configured to guide a motion of the second substrate support structure to fold the flexible substrate and to unfold the flexible substrate.

3. The flexible substrate testing system as defined in claim 2, wherein the first guide is configured to guide the motion of the second substrate support structure in accordance with a first predetermined bend radius of the flexible substrate.

4. The flexible substrate testing system as defined in claim 1, further comprising:
   a first guide configured to guide a motion of the second substrate support structure to fold the flexible substrate and to unfold the flexible substrate, wherein the first guide is configured to guide the motion of the second substrate support structure in accordance with a first predetermined bend radius of the flexible substrate and wherein the first guide is interchangeable with a second guide configured to guide the motion of the second substrate support structure in accordance with a second predetermined bend radius of the flexible substrate.

5. The flexible substrate testing system as defined in claim 4, wherein the first guide comprises a first guide plate having a groove configured to guide a cam follower attached to the second substrate support structure.

6. The flexible substrate testing system as defined in claim 1, further comprising:

a first guide configured to guide a motion of the second substrate support structure to fold the flexible substrate and to unfold the flexible substrate wherein the first guide comprises a first guide plate having a groove configured to guide a cam follower attached to the second substrate support structure and the first guide plate comprises an actuator groove configured to guide an actuator pin coupled to the second substrate support structure and positioned within the actuator groove, wherein the actuator is configured to move the second substrate support structure by moving the actuator pin.

7. The flexible substrate testing system as defined in claim 6, wherein the first guide is configured to guide the motion of the second substrate support structure without incurring additional stress on the flexible substrate due to the motion or weight of the second substrate support structure.

8. The flexible substrate testing system as defined in claim 6, further comprising a second guide plate coupled to the second substrate support structure and on an opposite side of the second substrate support structure from the first guide, the second guide plate configured to guide the motion of the second substrate support structure to fold the flexible substrate and to unfold the flexible substrate.

9. The flexible substrate testing system as defined in claim 1, further comprising a load limiter configured to limit displacement of the first substrate support structure toward the load cell.

10. The flexible substrate testing system as defined in claim 1, further comprising control circuitry configured to determine the load on the flexible substrate based on load information from the load cell.

11. The flexible substrate testing system as defined in claim 10, wherein the control circuitry is configured to determine the load on the flexible substrate based on a dynamic load measured by the load cell during the folding or unfolding of the flexible substrate.

12. The flexible substrate testing system as defined in claim 10, wherein the control circuitry is configured to determine the load on the flexible substrate based on a static load measured by the load cell at a completion of the folding or unfolding of the flexible substrate.

13. The flexible substrate testing system as defined in claim 1, further comprising control circuitry configured to control the actuator to move the second substrate support structure in a first direction to fold the flexible substrate or in a second direction to unfold the flexible substrate.

14. The flexible substrate testing system as defined in claim 1, wherein the flexure, the first substrate support structure, and the second substrate support structure are coupled to same base plate.

15. The flexible substrate testing system as defined in claim 1, wherein the load cell is configured to measure the load on the first portion of the flexible substrate.

16. The flexible substrate testing system as defined in claim 1, wherein the load cell is configured to measure at least a portion of the load on the second portion of the flexible substrate.

17. The flexible substrate testing system as defined in claim 16, further comprising control circuitry configured to compensate a load measurement from the load cell for a weight of the second substrate support structure and an inertial load of the second substrate support structure during folding or unfolding, and to determine at least a portion of the load on the flexible substrate based on load information from the load cell and the compensation.

18. The flexible substrate testing system as defined in claim 16, further comprising a second load cell configured to measure a portion of the load on the first portion of the flexible substrate.

19. A method to measure loads on a flexible substrate, the method comprising:

holding stationary, via a substrate support structure, a first portion of a flexible substrate under test;

moving, via an actuator, a second portion of the flexible substrate to fold the flexible substrate or to unfold the flexible substrate;

limiting motion, via a flexure, for the first portion of the substrate support structure in a direction parallel to the first portion of the substrate support structure; and measuring a load on the flexible substrate resulting from the moving.

20. A flexible substrate testing system, comprising:

a first plate comprising a first surface configured to hold stationary a first side of a flexible substrate under test;

a flexure configured to hold the first plate and to limit motion of the first plate in directions parallel to the first surface of the first plate;

a second plate comprising a second surface configured to hold a second side of the flexible substrate;

a first guide plate configured to guide a motion of the second surface to fold the flexible substrate and to unfold the flexible substrate;

an actuator configured to move the second plate in accordance with the first guide plate to fold the flexible substrate and to unfold the flexible substrate; and a load cell configured to measure loads on the first plate while the actuator moves the second plate.

* * * * *